(12) United States Patent
Johnson et al.

(10) Patent No.: US 8,464,435 B2
(45) Date of Patent: Jun. 18, 2013

(54) OFFSET CHECK GAUGE FOR FLEXIBLE BELLOWS

(75) Inventors: James Mark Johnson, Dubuque, IA (US); Adam John Eisbach, Dubuque, IA (US); Daniel Philip Ellert-Beck, Dubuque, IN (US)

(73) Assignee: Deere & Company, Moline, IL (US)

( * ) Notice: Subject to any disclaimer, the term of this patent is extended or adjusted under 35 U.S.C. 154(b) by 345 days.

(21) Appl. No.: 13/035,111

(22) Filed: Feb. 25, 2011

(65) Prior Publication Data

US 2012/0217737 A1    Aug. 30, 2012

(51) Int. Cl.
G01B 5/25    (2006.01)

(52) U.S. Cl.
USPC .............................................. 33/600; 33/613

(58) Field of Classification Search
USPC .................... 33/600, 607, 613, 645
See application file for complete search history.

(56) References Cited

U.S. PATENT DOCUMENTS 5,101,573 A *  4/1992  Mills et al. ..................... 33/600
5,901,754 A    5/1999  Elsässer et al.
6,658,753 B2 * 12/2003  Tatarnic ........................... 33/613
7,478,483 B2 *  1/2009  Wrzyszczynski ............... 33/645
7,690,128 B1 *  4/2010  Thompson ...................... 33/613
2002/0095813 A1 *  7/2002  Tatarnic ........................... 33/613
2006/0010703 A1 *  1/2006  Gauthier ......................... 33/613
2008/0168764 A1    7/2008  Recker et al.
2011/0252658 A1 * 10/2011  Knudsen ......................... 33/645

FOREIGN PATENT DOCUMENTS

DE      40 34 055 A1    5/1991
DE      697 18 237 T2   6/2003

OTHER PUBLICATIONS

John Deere "Off-Highway Diesel Engine Ratings, Interim Tier 4/Stage III B Engines" Catalog, Oct. 2003, can also be found at www.JohnDeere.com/tier4 (1 pg.).
Corresponding German Office Action, mailed Apr. 27, 2012, 5 pages.

* cited by examiner

*Primary Examiner* — G. Bradley Bennett
(74) *Attorney, Agent, or Firm* — Faegre Baker Daniels LLP

(57) ABSTRACT

A gauge is provided that may be used to facilitate proper installation of a flexible bellow in a vehicle between an engine and an exhaust treatment system of the vehicle. A method of using the gauge to facilitate proper installation of the flexible bellow in the vehicle is also provided.

24 Claims, 7 Drawing Sheets

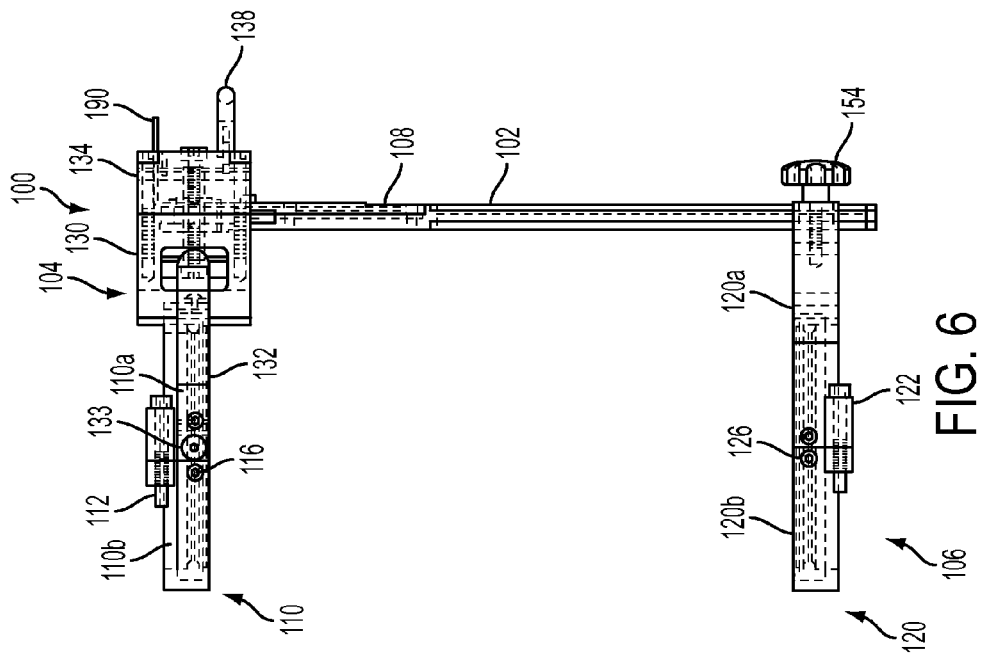
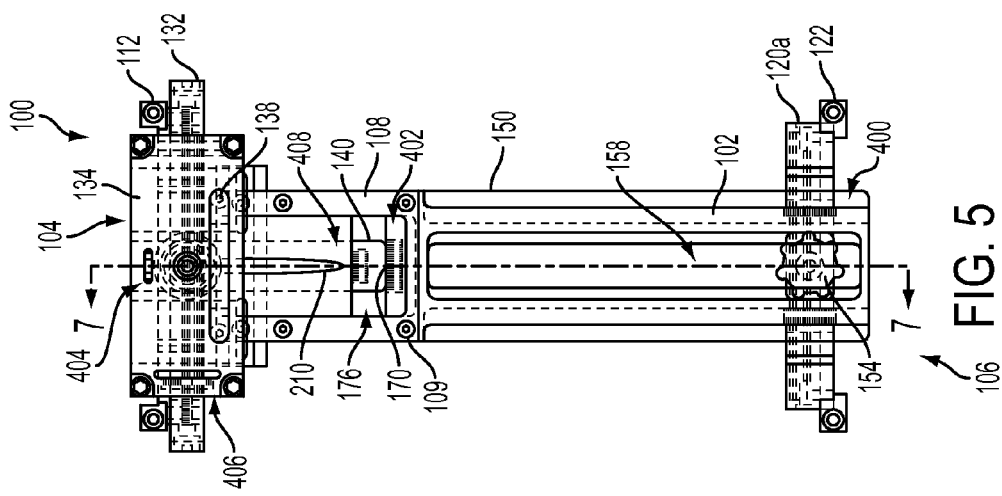

OFFSET CHECK GAUGE FOR FLEXIBLE BELLOWS

FIELD OF THE DISCLOSURE

The present disclosure relates to gauge for use with a flexible bellow. More particularly, the present disclosure relates to a gauge for use with a flexible bellow installed in a vehicle, and to a method of using the same to facilitate proper installation of the flexible bellow in the vehicle.

BACKGROUND OF THE DISCLOSURE

The U.S. Environmental Protection Agency (EPA) has adopted a comprehensive program to reduce emissions from future off-highway vehicles. The EPA's Interim Tier 4/Stage III B emissions regulations call for a 90 percent reduction in particulate matter (PM) and a 50 percent drop in nitrogen oxides ($NO_x$). The EPA's Final Tier 4/Stage IV emissions regulations, which may be fully implemented by 2015, are expected to take PM and $NO_x$ emissions to near-zero levels.

Advanced exhaust treatment systems are needed to satisfy the EPA's emissions regulations. Such exhaust treatment systems must be reliable to maintain continued compliance with the EPA's emissions regulations. If one part of an exhaust treatment system were to fail, a leak could develop, causing the exhaust treatment system to fall out of compliance with the EPA's emissions regulations.

SUMMARY

The present disclosure provides a gauge that may be used to facilitate proper installation of a flexible bellow in a vehicle between an engine and an exhaust treatment system of the vehicle. According to an exemplary embodiment of the present disclosure, the gauge may facilitate proper installation of the flexible bellow in five independent degrees of freedom. A method of using the gauge to facilitate proper installation of the flexible bellow in the vehicle is also provided.

According to an embodiment of the present disclosure, a gauge is provided to facilitate proper installation of a flexible bellow in a vehicle, the flexible bellow having a first end, a second end, and a longitudinal axis that extends from the first end to the second end, the flexible bellow configured to convey exhaust gases from an engine of the vehicle to an exhaust treatment system of the vehicle. The gauge includes an elongate base body having a first end and a second end, a first holder located proximate the first end of the base body, the first holder sized to receive the first end of the flexible bellow and configured to rotate relative to the base body about a first axis, a second holder located proximate the second end of the base body, the second holder sized to receive the second end of the flexible bellow, and a first measuring scale for measuring rotation of the first holder relative to the base body about the first axis.

According to another embodiment of the present disclosure, a gauge is provided to facilitate proper installation of a flexible bellow in a vehicle, the flexible bellow having a first end, a second end, and a longitudinal axis that extends from the first end to the second end, the flexible bellow configured to convey exhaust gases from an engine of the vehicle to an exhaust treatment system of the vehicle. The gauge includes an elongate base body having a first end and a second end, a first holder moveably coupled to the first end of the base body, the first holder configured to receive the first end of the flexible bellow, a second holder coupled to the second end of the base body, the second holder configured to receive the second end of the flexible bellow, and a measuring scale that measures and communicates at least one of a distance translated by the first holder relative to the base body; and an angle rotated by the first holder relative to the base body.

According to yet another embodiment of the present disclosure, a gauge is provided to facilitate proper installation of a flexible bellow in a vehicle, the flexible bellow having a first end, a second end, and a longitudinal axis that extends from the first end to the second end, the flexible bellow configured to convey exhaust gases from an engine of the vehicle to an exhaust treatment system of the vehicle, the flexible bellow having a first degree of freedom in which the first and second ends of the flexible bellow are translatable axially along the longitudinal axis, a second degree of freedom in which the first and second ends of the flexible bellow are translatable side-to-side along a second axis perpendicular to the longitudinal axis, a third degree of freedom in which the first and second ends of the flexible bellow are translatable back-and-forth along a third axis perpendicular to the longitudinal axis and perpendicular to the second axis, a fourth degree of freedom in which the first and second ends of the flexible bellow are rotatable back-and-forth about the second axis, and a fifth degree of freedom in which the first and second ends of the flexible bellow are rotatable side-to-side about the third axis. The gauge includes an elongate base body having a first end and a second end, a first holder moveably coupled to the first end of the base body, the first holder configured to receive the first end of the flexible bellow, a second holder coupled to the second end of the base body, the second holder configured to receive the second end of the flexible bellow, a first measuring scale indicating a first offset of the flexible bellow from a first reference point in the first degree of freedom, a second measuring scale indicating a second offset of the flexible bellow from a second reference point in the second degree of freedom, a third measuring scale indicating a third offset of the flexible bellow from a third reference point in the third degree of freedom, a fourth measuring scale indicating a fourth offset of the flexible bellow from a fourth reference point in the fourth degree of freedom, and a fifth measuring scale indicating a fifth offset of the flexible bellow from a fifth reference point in the fifth degree of freedom.

According to still yet another embodiment of the present disclosure, a method is provided for facilitating proper installation of a flexible bellow using a gauge, the flexible bellow having a first end, a second end, a first degree of freedom in which the first and second ends of the flexible bellow are translatable along a first axis, and a second degree of freedom in which the first and second ends of the flexible bellow are rotatable about a second axis. The method includes the steps of providing a vehicle having an engine and an exhaust treatment system, the flexible bellow extending between the engine and the exhaust treatment system, coupling a first end of the gauge to the first end of the flexible bellow, coupling a second end of the gauge to the second end of the flexible bellow, and using a scale on the gauge to measure at least one of a distance translated by the flexible bellow in the first degree of freedom and an angle rotated by the flexible bellow in the second degree of freedom.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein:

FIG. 5 is a front elevational view of the gauge of FIG. 3;

FIG. 6 is a side elevational view of the gauge of FIG. 3;

Corresponding reference characters indicate corresponding parts throughout the several views. The exemplifications set out herein illustrate exemplary embodiments of the disclosure and such exemplifications are not to be construed as limiting the scope of the invention in any manner.

DETAILED DESCRIPTION

Figure 1:
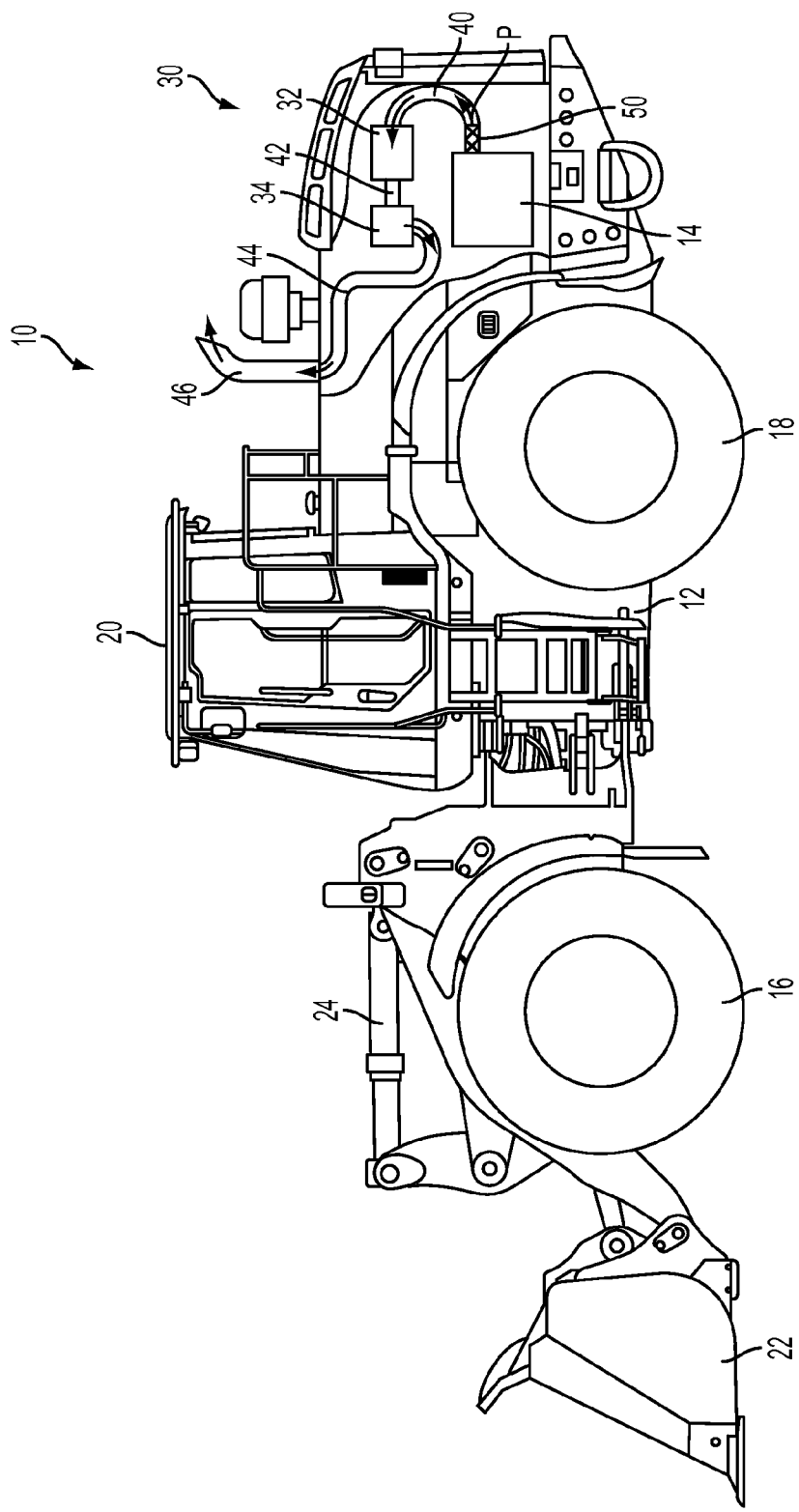
FIG. 1 is a side view of a loader including an engine and an exhaust treatment system, the loader further including a flexible bellow between the engine and the exhaust treatment system.

Referring to FIG. 1, an off-highway vehicle is provided in the form of a loader 10. Although the vehicle is illustrated and described herein as loader 10, the vehicle may be in the form of a tractor, a bulldozer, a motor grader, an excavator, a crawler, or another agricultural or utility vehicle, for example. Loader 10 includes chassis 12, engine 14, and a ground engaging mechanism, illustratively front wheels 16 and rear wheels 18. It is also within the scope of the present disclosure that the ground engaging mechanism of loader 10 may include belts or steel tracks, for example. In use, engine 14 drives the ground engaging mechanism via a transmission (not shown), causing loader 10 to propel across the ground.

Loader 10 of FIG. 1 also includes operator cab 20 supported by chassis 12 to house and protect the operator of loader 10. Operator cab 20 may include foot pedals, a steering wheel, joysticks, monitors, and other controls (not shown) for operating loader 10.

Loader 10 of FIG. 1 further includes a work tool in the form of bucket 22. Other suitable work tools include, for example, blades, forks, tillers, and mowers. Bucket 22 is moveably coupled to chassis 12 for scooping, carrying, and dumping dirt and other materials. In the illustrated embodiment of FIG. 1, at least one hydraulic cylinder 24 is provided to operate bucket 22. The operator may control the movement of bucket 22 using joysticks or other controls (not shown) located within operator cab 20.

To reduce emissions from loader 10, an exhaust treatment system 30 is provided. Exhaust system 30 may be mounted to chassis 12 of loader 10. As shown in FIG. 1, exhaust system 30 of loader 10 is coupled to engine 14 and includes a catalyzed exhaust filter 32 and a particulate filter 34. Catalyzed exhaust filter 32 contains a diesel oxidation catalyst (DOC) that is configured to react with exhaust gases to reduce carbon monoxide, hydrocarbons, and some particulate matter. Particulate filter 34 contains porous channel walls that are configured to trap and hold remaining particulate matter. It is also within the scope of the present disclosure that exhaust system 30 may include a $NO_x$ reduction unit (not shown) and/or other suitable treatment units.

In operation, exhaust gases from engine 14 flow along flow path P to catalyzed exhaust filter 32 of exhaust system 30 via a first pipe 40. After being treated in catalyzed exhaust filter 32, the exhaust gases continue to particulate filter 34 of exhaust system 30 via a second pipe 42. From particulate filter 34, the exhaust gases travel through a third pipe 44. Finally, the treated exhaust gases are released into the environment via a fourth pipe 46 that is externally mounted atop chassis 12 of loader 10.

When loader 10 is running, engine 14 increases in temperature, which may cause engine 14 to thermally expand. When loader 10 is no longer running, engine 14 may thermally contract. Engine 14 also vibrates when loader 10 is running. To compensate for the thermal expansions/contractions of engine 14 and the vibrations of engine 14, a flexible tube or bellow 50 is provided between engine 14 and the chassis-mounted exhaust system 30. In the illustrated embodiment of FIG. 1, bellow 50 is located between engine 14 and the first pipe 40 of exhaust system 30, although the exact location of bellow 50 may vary. For example, bellow 50 may be located between first pipe 40 and catalyzed exhaust filter 32 of exhaust system 30. As engine 14 moves, bellow 50 is able to convey exhaust gases to exhaust system 30 along flow path P while extending, compressing, and bending as necessary, to absorb the movements of engine 14. In this manner, bellow 50 prevents the movements of engine 14 from being transferred to exhaust system 30, and in particular to catalyzed exhaust filter 32 and particulate filter 34 of exhaust system 30.

Bellow 50 should be internally hollow and externally gas-tight to convey exhaust gases along flow path P, but also should be flexible. Bellow 50 may be formed of metal, such as stainless steel, arranged in a mesh-like or woven pattern. In certain embodiments, bellow 50 may be constructed by hydro-forming thin-walled tubing to produce convolutions, inserting a spiral-wound liner into the convolutions, and then welding or otherwise securing the liner in place. The material, internal diameter, external diameter, and length of bellow 50 may vary depending on the arrangement of engine 14 and exhaust system 30. Exemplary metallic bellows are disclosed in U.S. Pat. No. 5,901,754 to Elsässer et al., entitled "Flexible Fluid Conduit Element with Flexible Bellows," the disclosure of which is expressly incorporated herein by reference. Exemplary metallic bellows are also commercially available from Witzenmann USA of Warren, Mich. and American BOA Inc. of Cumming, Ga.

Referring next to FIGS. 2-8, an illustrative gauge 100 is provided to facilitate proper installation of bellow 50. According to an exemplary embodiment of the present disclosure, gauge 100 may facilitate proper installation of bellow 50 in five independent degrees of freedom. The improper installation of bellow 50 could cause bellow 50 to fail (e.g., to develop a leak) prematurely. As a result, the leaking exhaust system 30 could become non-compliant with the EPA's emissions regulations. Thus, by facilitating proper installation of bellow 50, gauge 100 may facilitate the long-term durability of bellow 50 and the long-term operability and compliance of exhaust system 30.

Figure 2:
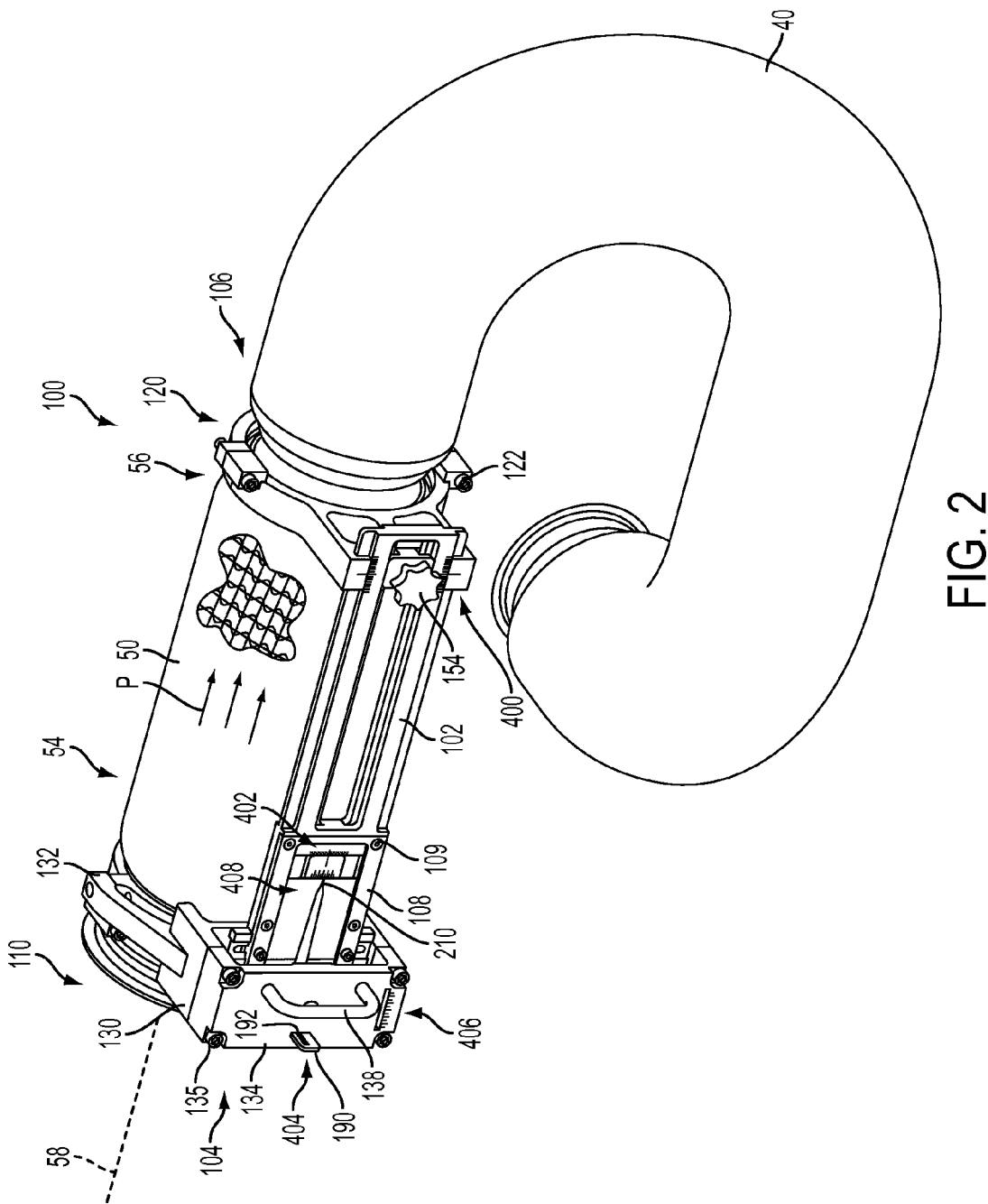
FIG. 2 is a perspective view of an exemplary gauge of the present disclosure, the gauge shown coupled to the bellow of FIG. 1.
Figure 3:
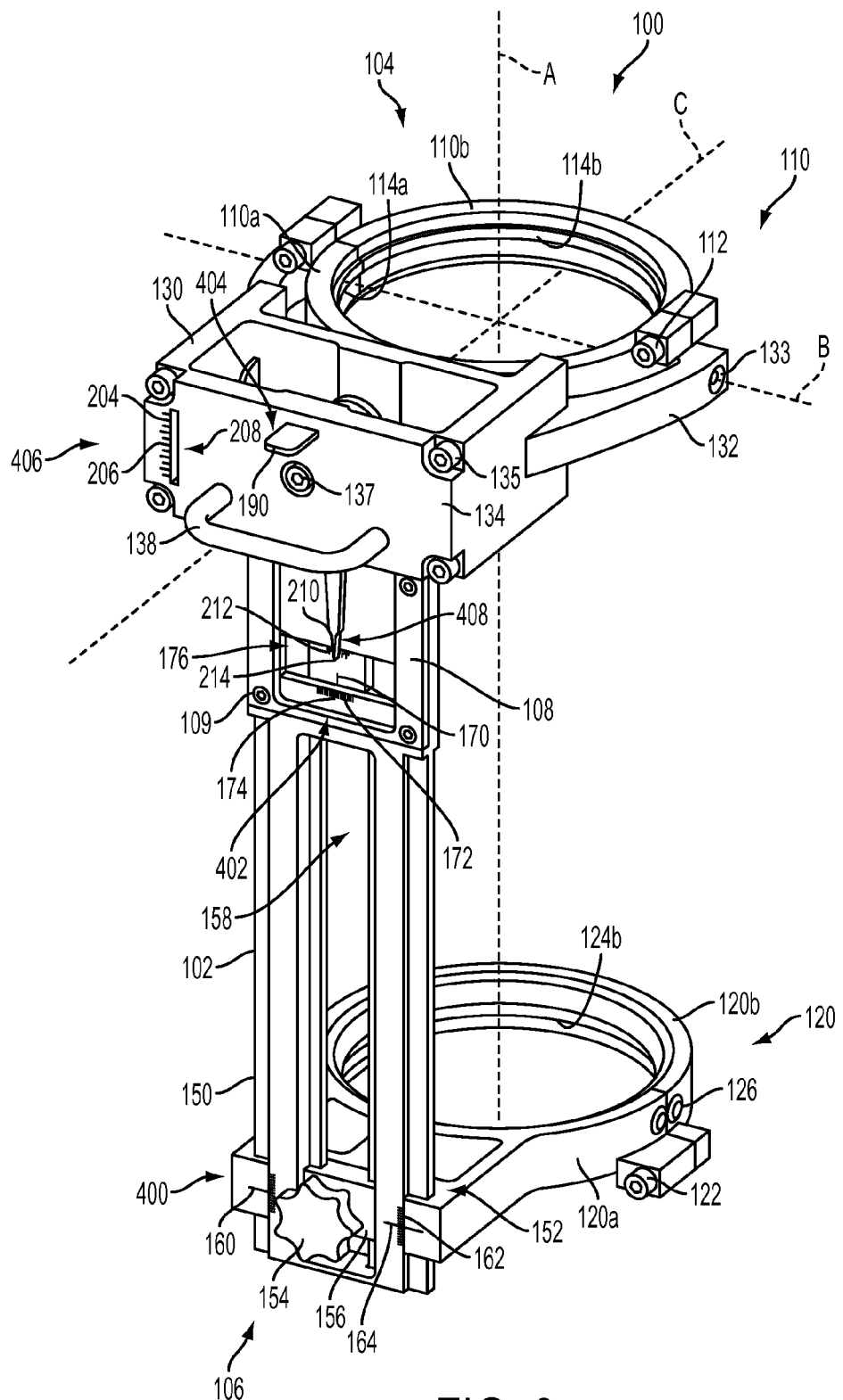
FIG. 3 is another perspective view of the gauge of FIG. 2, the gauge shown without the bellow of FIG. 1.
Figure 4:
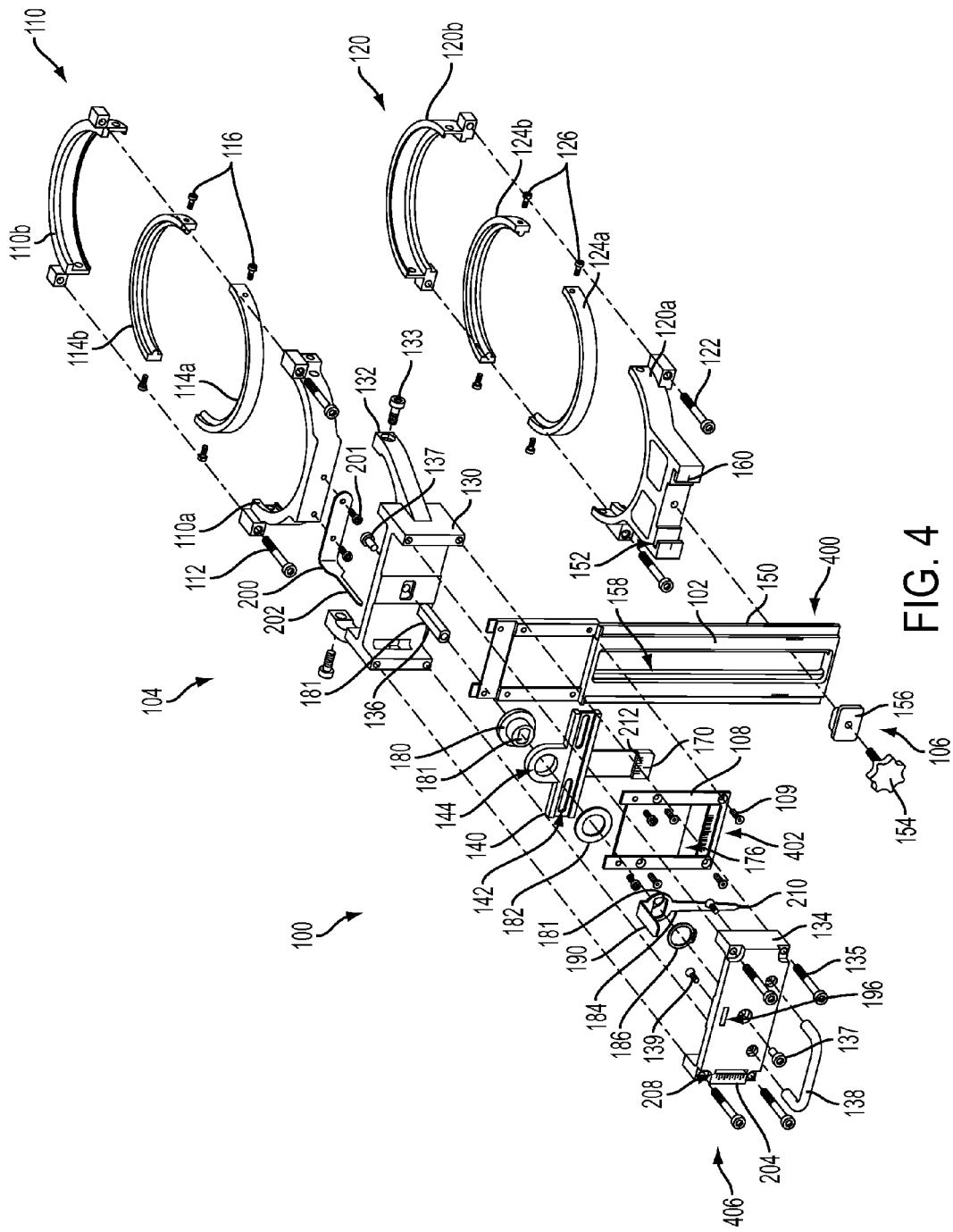
FIG. 4 is an exploded perspective view of the gauge of FIG. 3.
Figure 8:
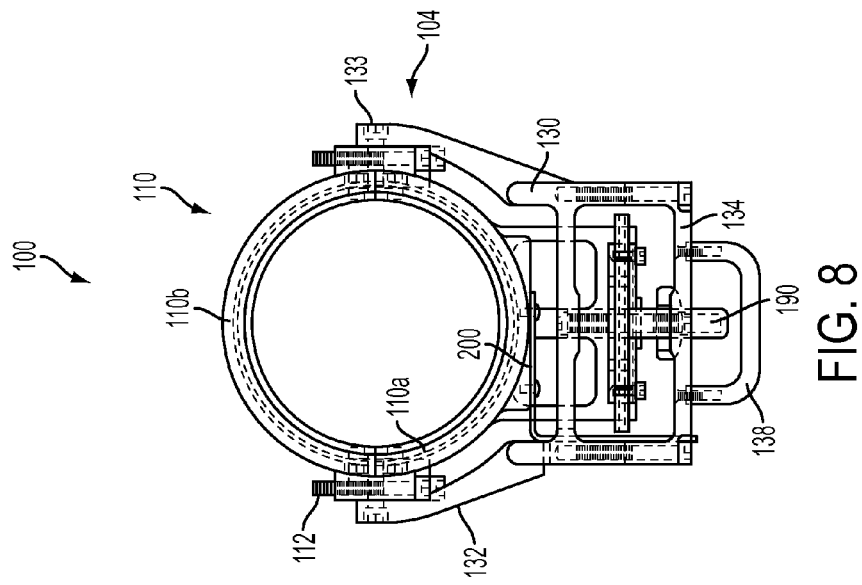
FIG. 8 is a top plan view of the gauge of FIG. 3.

As shown in FIGS. 2-4, gauge 100 includes an elongate base body 102 that extends from first end 104 to second end 106 in a direction substantially parallel to longitudinal axis 58 of bellow 50. First end 104 of gauge 100 is configured to couple to first end 54 of bellow 50, and second end 106 of gauge 100 is configured to couple to second end 56 of bellow 50. Near first end 104 of gauge 100, cover plate 108 is mounted to base 102, such as using screws 109.

A first holder or clamp 110 is provided near first end 104 of gauge 100 for receiving and holding first end 54 of bellow 50.

First clamp 110 includes support member 110a and clamp member 110b that is moveably coupled to support member 110a. By tightening and loosening screws 112, clamp member 110b is configured to slide toward and away from support member 110a to hold and release first end 54 of bellow 50 therebetween. Support member 110a and clamp member 110b of first clamp 110 may include corresponding inserts 114a and 114b, which may be secured in place with screws 116 or other suitable fasteners. Inserts 114a and 114b may be constructed of a polymeric material, such as polyoxymethylene (POM), to avoid damaging first end 54 of bellow 50 when clamped therebetween.

A second holder or clamp 120 is provided near second end 106 of gauge 100 for receiving and holding second end 56 of bellow 50. Second clamp 120 includes support member 120a and clamp member 120b that is moveably coupled to support member 120a. By tightening and loosening screws 122, clamp member 120b is configured to slide toward and away from support member 120a to hold and release second end 56 of bellow 50 therebetween. Support member 120a and clamp member 120b of second clamp 120 may include corresponding inserts 124a and 124b, which may be secured in place with screws 126 or other suitable fasteners. Like inserts 114a and 114b of first clamp 110, inserts 124a and 124b of second claim 120 may be constructed of a polymeric material, such as POM, to avoid damaging second end 56 of bellow 50 when clamped therebetween.

Referring still to FIGS. 2-4, mount 130 is provided near first end 104 of gauge 100 for receiving first clamp 110. In the illustrated embodiment, mount 130 includes arms 132 that are spaced apart to receive support member 110a of first clamp 110 therebetween. Support member 110a of first clamp 110 may be coupled to arms 132 of mount 130 using pins 133 or screws, for example. Cover 134 may be provided to enclose mount 130. Cover 134 may be removably secured to mount 130, such as using screws 135 or bolts, for example. An internal shaft 136 extends between mount 130 and cover 134. In the illustrated embodiment, shaft 136 is removably secured to both mount 130 and cover 134 using screws 137, but it is also within the scope of the present disclosure that shaft 136 may be integrally formed with mount 130 and/or cover 134. Cover 134 may include handle 138 to enable a user to hold, carry, and manipulate gauge 100. Handle 138 may be removably secured to cover 134 using screws 139, or handle 138 may be integrally formed with cover 134.

Figure 7:
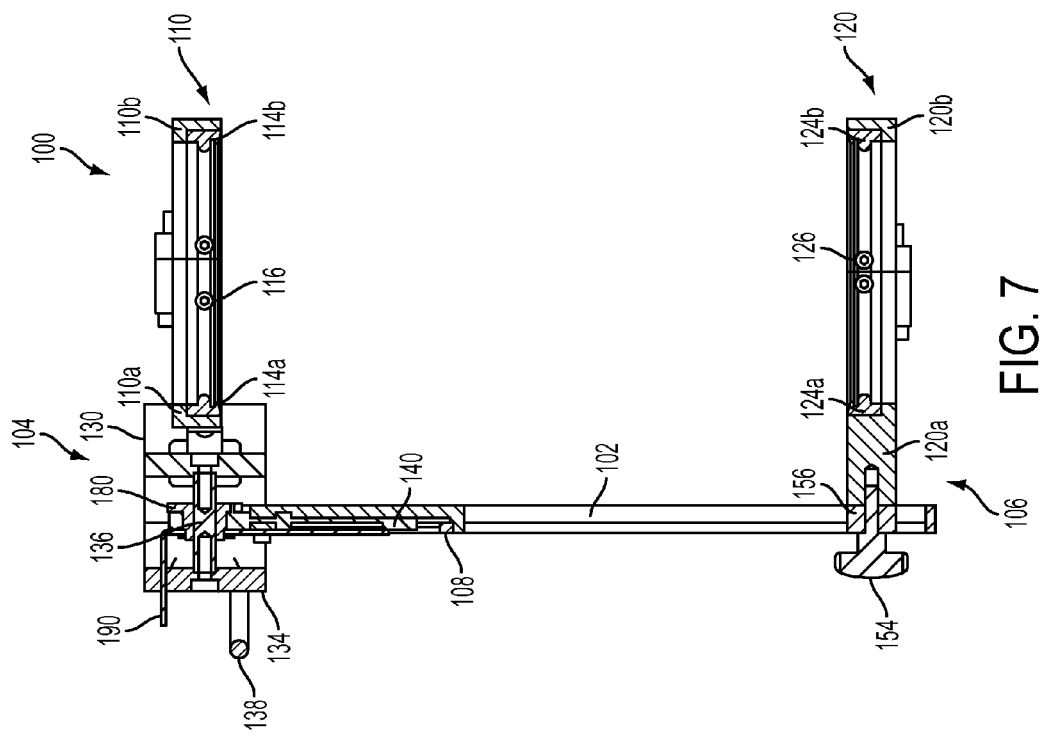
FIG. 7 is a cross-sectional view of the gauge of FIG. 5, taken along line 7-7 of FIG. 5.

Gauge 100 further includes slider 140 that couples mount 130 to base 102, as shown in FIG. 7. When cover plate 108 is secured onto base 102, such as using screws 109, slider 140 is retained therebetween. For example, slider 140 may include at least one slot 142 that is configured to receive at least one screw 109, such that the at least one screw 109 passes through cover plate 108, through slot 142 of slider 140, and into base 102. Base 102 and/or cover plate 108 may also conform to the shape of slider 140 to prevent slider 140 from falling downward between base 102 and cover plate 108 toward second end 106 of gauge 100. Also, when cover 134 is secured onto mount 130, slider 140 is retained therebetween. For example, slider 140 may include opening 144 that is configured to receive shaft 136, such that shaft 136 passes from mount 130, through opening 144 in slider 140, and to cover 134. Additional features of slider 140 are discussed further below.

With first clamp 110 of gauge 100 secured to first end 54 of bellow 50 and second clamp 120 of gauge 100 secured to second end 56 of bellow 50, as shown in FIG. 2, the position of bellow 50 may be evaluated. For clarity and consistency, the position of bellow 50 is described herein relative to base 102 of gauge 100. According to an exemplary embodiment of the present disclosure, the position of bellow 50 may be evaluated relative to base 102 of gauge 100 in five independent degrees of freedom.

Gauge 100 may be used to evaluate bellow 50 in a first degree of freedom—the axial or longitudinal displacement of bellow 50 along axis A or an axis parallel thereto. In the illustrative embodiment, the axial or longitudinal displacement of bellow 50 is evaluated by measuring the axial or longitudinal displacement of second clamp 120 relative to base 102. It is also within the scope of the present disclosure that the axial or longitudinal displacement of bellow 50 could be evaluated by measuring the axial or longitudinal displacement of first clamp 110 alone or the axial or longitudinal displacement of both first clamp 110 and second clamp 120.

According to an exemplary embodiment of the present disclosure, second clamp 120 is configured to slide relative to base 102 along axis A. For example, base 102 of gauge 100 may include opposing rails 150 and second clamp 120 of gauge 100 may define opposing recesses 152 that are sized and shaped to receive rails 150 of base 102 therein, such that second clamp 120 is configured to slide over rails 150 of base 102. Specifically, support member 120a of second clamp 120 may define the opposing recesses 152.

Knob 154 and stop 156 may be provided to selectively lock second clamp 120 in place relative to base 102. With knob 154 and stop 156 arranged in front of base 102 and second clamp 120 arranged behind base 102, knob 154 extends through an elongate slot 158 in base 102 and threads into support member 120a of second clamp 120. In an unlocked position, knob 154 is sufficiently loosened from support member 120a of second clamp 120 to allow second clamp 120 to slide relative to base 102 along axis A. In a locked position, knob 154 is tightened into support member 120a of second clamp 120 to pinch base 102 between support member 120a and stop 156, which prevents second clamp 120 from sliding relative to base 102 along axis A.

A first measuring scale 400 may be provided to measure the axial or longitudinal displacement of second clamp 120 relative to base 102. In the illustrated embodiment of FIG. 4, second clamp 120 includes one or more pointers 160 and base 102 includes a plurality of distance markers 162 located on either side of reference point 164. For example, distance markers 162 may be arranged in 1 millimeter (mm) increments and extend +/−12 mm from reference point 164 (0 mm), although these values may vary depending on the axial or longitudinal displacement tolerance of the selected bellow 50.

Gauge 100 may also be used to evaluate bellow 50 in a second degree of freedom—the side-to-side displacement of bellow 50 along axis B or an axis parallel thereto. In the illustrative embodiment, the side-to-side displacement of bellow 50 is evaluated by measuring the side-to-side displacement of first clamp 110 relative to base 102. It is also within the scope of the present disclosure that the side-to-side displacement of bellow 50 could be evaluated by measuring the side-to-side displacement of second clamp 120 alone or the side-to-side displacement of both first clamp 110 and second clamp 120.

According to an exemplary embodiment of the present disclosure, slider 140 is configured to slide side-to-side relative to base 102 along axis B. For example, slots 142 in slider 140 that receive screws 109 between base 102 and cover plate 108 may be elongate in shape, allowing slider 140 to slide side-to-side across screws 109. Because first clamp 110 is coupled to slider 140 via shaft 136 of mount 130, first clamp 110 is also configured to slide side-to-side relative to base 102 along axis B.

A second measuring scale 402 may be provided to measure the side-to-side displacement of first clamp 110 and slider 140 relative to base 102. In the illustrated embodiment of FIG. 4, slider 140 includes pointer 170 and cover plate 108 (which is fixedly coupled to base 102) includes a plurality of distance markers 172 located on either side of reference point 174. For example, distance markers 172 may be arranged in 1 millimeter (mm) increments and extend +/−12 mm from reference point 174 (0 mm), although these values may vary depending on the side-to-side displacement tolerance of the selected bellow 50. As shown in FIG. 3, pointer 170 on slider 140 is visible through window 176 in cover plate 108, with distance markers 172 on cover plate 108 being located adjacent to pointer 170 in window 176.

Gauge 100 may also be used to evaluate bellow 50 in a third degree of freedom—the back-and-forth displacement of bellow 50 along axis C or an axis parallel thereto. In the illustrative embodiment, the back-and-forth displacement of bellow 50 is evaluated by measuring the back-and-forth displacement of first clamp 110 relative to base 102. It is also within the scope of the present disclosure that the back-and-forth displacement of bellow 50 could be evaluated by measuring the back-and-forth displacement of second clamp 120 alone or the back-and-forth displacement of both first clamp 110 and second clamp 120.

According to an exemplary embodiment of the present disclosure, mount 130 is configured to slide back-and-forth relative to base 102 and slider 140 along axis C. For example, as shown in FIG. 4, gauge 100 includes bushing 180 that is sized to receive shaft 136 of mount 130. Shaft 136 of mount 130 is configured to slide freely back-and-forth through bushing 180, but shaft 136 and bushing 180 may include corresponding internal/external flats 181 to prevent relative rotation between shaft 136 and bushing 180. Gauge 100 also includes thrust bearing 182, indicator 184, and retaining ring 186 that fit around bushing 180. When assembled, retaining ring 186 clamps onto bushing 180 to secure slider 140, thrust bearing 182, and indicator 184 onto bushing 180. Thus, as shaft 136 of mount 130 slides freely back-and-forth through bushing 180, shaft 136 of mount 130 also slides freely back-and forth through opening 144 in slider 140, thrust bearing 182, indicator 184, and retaining ring 186. The length of shaft 136 may vary to accommodate the desired back-and-forth motion of mount 130. Because first clamp 110 is coupled to mount 130, first clamp 110 is also configured to slide back-and-forth relative to base 102 and slider 140 along axis C.

A third measuring scale 404 may be provided to measure the back-and-forth displacement of first clamp 110 relative to base 102 and slider 140. In the illustrated embodiment of FIG. 2, indicator 184 includes a forward-extending tab 190 having a plurality of distance markers 192 thereon, optionally located on either side of reference point (not shown). For example, distance markers 192 may be arranged in 1 mm increments and extend +/−12 mm from the reference point (0 mm), although these values may vary depending on the back-and-forth displacement tolerance of the selected bellow 50. As shown in FIGS. 3 and 4, tab 190 of indicator 184 extends through window 196 in cover 134 (which is fixedly coupled to mount 130). In this embodiment, the last distance marker 192 that is visible through window 196 of cover 134 indicates the back-and-forth displacement measurement.

Gauge 100 may also be used to evaluate bellow 50 in a fourth degree of freedom—the back-and-forth bend of bellow 50 about axis B or an axis parallel thereto. In the illustrative embodiment, the back-and-forth bend of bellow 50 is evaluated by measuring the back-and-forth bend of first clamp 110 relative to base 102. It is also within the scope of the present disclosure that the back-and-forth bend of bellow 50 could be evaluated by measuring the back-and-forth bend of second clamp 120 alone or the back-and-forth bend of both first clamp 110 and second clamp 120.

According to an exemplary embodiment of the present disclosure, first clamp 110 is configured to rotate back-and-forth relative to mount 130 about axis B. For example, as shown in FIG. 4, first clamp 110 is configured to rotate back-and-forth between arms 132 of mount 130 about pins 133. Because mount 130 is coupled to base 102, first clamp 110 is also configured to rotate back-and-forth relative to base 102 about axis B.

A fourth measuring scale 406 may be provided to measure the back-and-forth rotation of first clamp 110 relative to mount 130 and base 102. In the illustrated embodiment of FIG. 4, gauge 100 includes indicator 200 that is coupled to the rotatable first clamp 110, such as using screws 201. Indicator 200 includes a forward-extending pointer 202. Cover 134 (which is fixedly coupled to mount 130) includes a plurality of rotation markers 204 thereon located on either side of reference point 206. For example, rotation markers 204 may be arranged in 1 degree increments and extend +/−5 degrees from reference point 206 (0 degrees), although these values may vary depending on the back-and-forth rotation tolerance of the selected bellow 50. As shown in FIGS. 3 and 4, pointer 202 of indicator 200 extends through window 208 in cover 134, with rotation markers 204 on cover 134 being located adjacent to pointer 202 in window 208.

Gauge 100 may also be used to evaluate bellow 50 in a fifth degree of freedom—the side-to-side bend of bellow 50 about axis C or an axis parallel thereto. In the illustrative embodiment, the side-to-side bend of bellow 50 is evaluated by measuring the side-to-side bend of first clamp 110 relative to base 102. It is also within the scope of the present disclosure that the side-to-side bend of bellow 50 could be evaluated by measuring the side-to-side bend of second clamp 120 alone or the side-to-side bend of both first clamp 110 and second clamp 120.

According to an exemplary embodiment of the present disclosure, mount 130 is configured to rotate side-to-side relative to base 102 and slider 140 about axis C. For example, as shown in FIG. 4, the rotation of shaft 136 of mount 130 is transferred to bushing 180 (e.g., via corresponding flats 181) and to indicator 184 which is mounted on bushing 180, such as via corresponding flats 181 or a close frictional relationship between the components. However, because bushing 180 is sized to rotate freely within opening 144 of slider 140, the rotation of shaft 136 is not transferred to slider 140. Thus, shaft 136 of mount 130 is configured to rotate freely side-to-side relative to both slider 140 and base 102 about axis C. Because first clamp 110 is coupled to mount 130, first clamp 110 is also configured to rotate side-to-side relative to slider 140 and base 102 about axis C. Suitable stops (not shown) may be located between bushing 180 and slider 140 to limit rotation of bushing 180 relative to slider 140.

A fifth measuring scale 408 may be provided to measure the side-to-side rotation of first clamp 110 relative to slider 140 and base 102. In the illustrated embodiment of FIG. 4, indicator 184 includes a downward-extending pointer 210. Slider 140 (which is rotationally fixed to base 102) includes a plurality of rotation markers 212 thereon located on either side of reference point 214. For example, rotation markers 212 may be arranged in 1 degree increments and extend +/−5 degrees from reference point 214 (0 degrees), although these values may vary depending on the side-to-side rotation tolerance of the selected bellow 50. As shown in FIG. 3, rotation markers 212 on slider 140 are visible through window 176 in cover plate 108.

If bellow 50 is able to undergo torsional or twisting movements, it is within the scope of the present disclosure that gauge 100 could be used to evaluate bellow 50 in a sixth degree of freedom—the axial rotation of bellow 50 about axis A or an axis parallel thereto. However, if bellow 50 is able to resist such torsional or twisting movements, measuring this sixth degree of freedom may be unnecessary.

It is also within the scope of the present disclosure that gauge 100 may be provided with suitable sensors for electronically evaluating movement of first clamp 110 and second clamp 120 relative to base 102. In this embodiment, measuring scales 400, 402, 404, 406, and 408 of gauge 100 may digitally communicate the position of bellow 50 in each degree of freedom.

Figure 9:
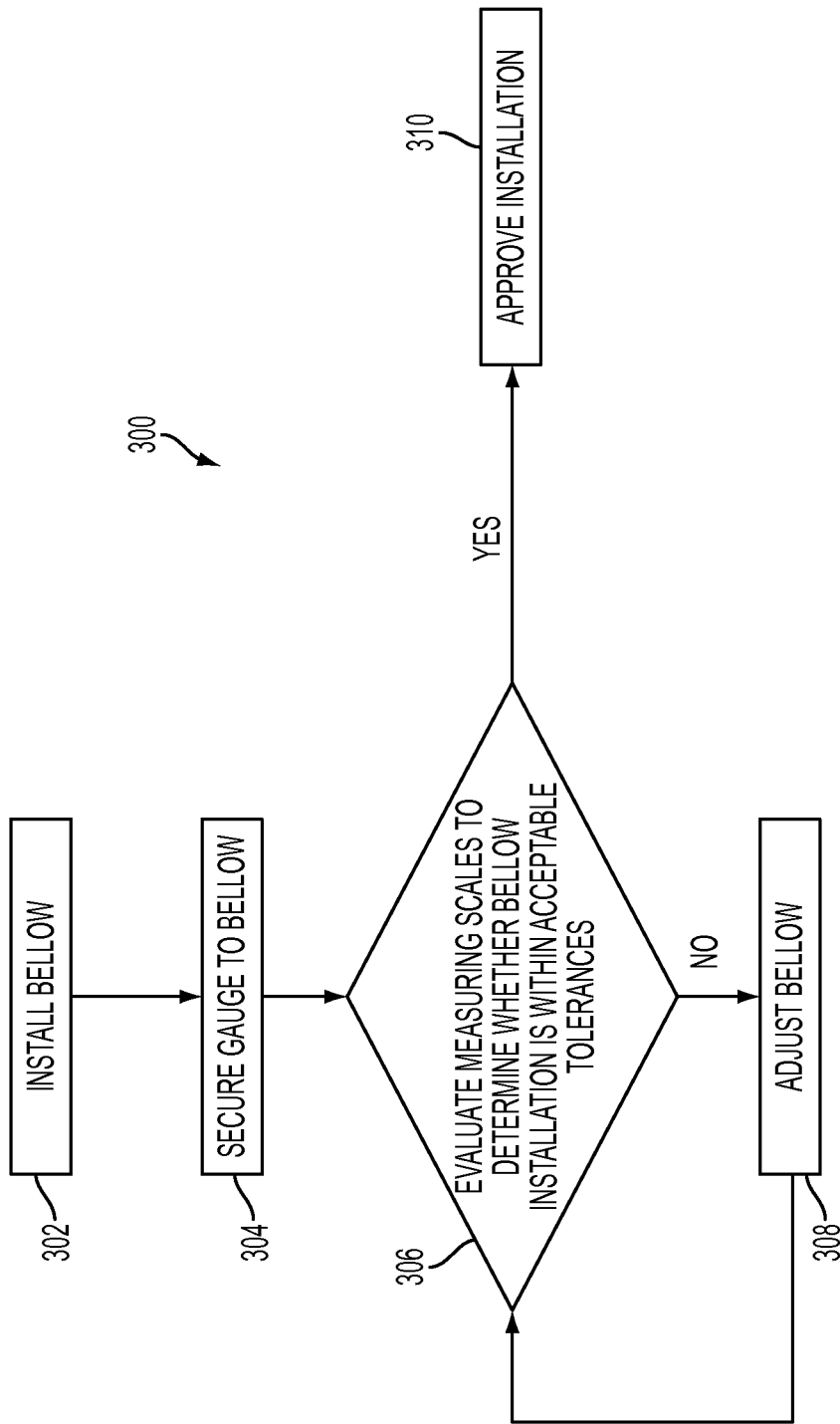
FIG. 9 is a flow chart representing an exemplary method of the present disclosure.

Referring next to FIG. 9, an exemplary method 300 is provided for facilitating proper installation of bellow 50.

First, at step 302 of method 300, bellow 50 is installed between engine 14 and exhaust system 30 of loader 10 (FIG. 1). Step 302 may occur during the original manufacture of loader 10 or when making subsequent repairs or adjustments to bellow 50.

Next, at step 304 of method 300, gauge 100 is secured to bellow 50. For example, with reference to FIG. 2, first clamp 110 of gauge 100 is secured to first end 54 of the installed bellow 50 and second clamp 120 of gauge 100 is secured to second end 56 of the installed bellow 50. It is also within the scope of the present disclosure that the installation step 302 and the securing step 304 may be reversed, such that gauge 100 is secured to bellow 50 before bellow 50 is installed in loader 10.

Then, at step 306 of method 300, the various measuring scales 400, 402, 404, 406, and 408 of gauge 100 are evaluated to determine whether bellow 50 is installed within acceptable tolerances. For example, the user may evaluate the measurements identified by pointers 160 of the first measuring scale 400, pointer 170 of the second measuring scale 402, tab 190 of the third measuring scale 404, pointer 202 of the fourth measuring scale 406, and pointer 210 of the fifth measuring scale 408. According to an exemplary embodiment of the present disclosure, pointers 160, pointer 170, tab 190, pointer 202, and pointer 210 of the various measuring scales are all generally visible from the same side of gauge 100 to facilitate easy viewing by the user. The user may optionally record these measurements for further analysis off-site.

If the evaluation step 306 reveals that bellow 50 is installed within acceptable tolerances, loader 10 may be approved for operation at step 310 of method 300. Otherwise, if the evaluation step 306 reveals that bellow 50 is installed outside of acceptable tolerances, bellow 50 may be adjusted, preferably with gauge 100 still in place, to bring the installation within acceptable tolerances before continuing to the approval step 310.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A gauge configured to facilitate proper installation of a flexible bellow in a vehicle, the bellow having a first end, a second end, and a longitudinal axis that extends from the first end to the second end, the flexible bellow configured to convey exhaust gases from an engine of the vehicle to an exhaust treatment system of the vehicle, the gauge including:
   an elongate base body having a first end and a second end;
   a first holder located proximate the first end of the base body, the first holder sized to receive the first end of the flexible bellow and configured to rotate relative to the base body about a first axis;
   a second holder located proximate the second end of the base body, the second holder sized to receive the second end of the flexible bellow; and
   a first measuring scale for measuring rotation of the first holder relative to the base body about the first axis.

2. The gauge of claim 1, wherein the first holder translates relative to the base body along the first axis, the gauge further including a second measuring scale for measuring translation of the first holder relative to the base body along the first axis.

3. The gauge of claim 1, wherein the first holder rotates relative to the base body about a second axis perpendicular to the first axis, the gauge further including a third measuring scale for measuring rotation of the first holder relative to the base body about the second axis.

4. The gauge of claim 3, wherein the first holder translates relative to the base body along the second axis, the gauge further including a fourth measuring scale for measuring translation of the first holder relative to the base body along the second axis.

5. The gauge of claim 1, wherein the second holder translates relative to the base body along a third axis perpendicular to the first axis, the gauge further including a fifth measuring scale for measuring translation of the second holder relative to the base body along the third axis.

6. The gauge of claim 5, wherein the third axis is parallel to the longitudinal axis of the flexible bellow.

7. The gauge of claim 5, further including a means for selectively locking the second holder in place relative to the base body along the third axis.

8. The gauge of claim 1, wherein each of the first and second holders includes a support member coupled to the base body and a clamp member moveably coupled to the corresponding support member and to the base body to clamp the flexible bellow onto the base body.

9. The gauge of claim 1, wherein the first measuring scale includes a pointer that travels with the first holder relative to the base body and a plurality of reference markers located on either side of a reference point, the pointer visually communicating an offset from the reference point.

10. A gauge configured to facilitate proper installation of a flexible bellow in a vehicle, the flexible bellow having a first end, a second end, and a longitudinal axis that extends from the first end to the second end, the flexible bellow configured to convey exhaust gases from an engine of the vehicle to an exhaust treatment system of the vehicle, the gauge including:
   an elongate base body having a first end and a second end;
   a first holder moveably coupled to the first end of the base body, the first holder configured to receive the first end of the flexible bellow;
   a second holder coupled to the second end of the base body, the second holder configured to receive the second end of the flexible bellow; and
   a measuring scale that measures and communicates at least one of:
      a distance translated by the first holder relative to the base body; and
      an angle rotated by the first holder relative to the base body.

11. The gauge of claim 10, wherein the measuring scale measures and communicates the distance translated by the first holder along a second axis perpendicular to the longitudinal axis.

12. The gauge of claim 11, further including another measuring scale that measures and communicates the distance translated by the first holder along a third axis perpendicular to the longitudinal axis.

13. The gauge of claim 10, wherein the measuring scale measures and communicates the angle rotated by the first holder about a second axis perpendicular to the longitudinal axis.

14. The gauge of claim 10, further including another measuring scale that measures and communicates a distance translated by the second holder along the longitudinal axis.

15. A gauge configured to facilitate proper installation of a flexible bellow in a vehicle, the flexible bellow having a first end, a second end, and a longitudinal axis that extends from the first end to the second end, the flexible bellow configured to convey exhaust gases from an engine of the vehicle to an exhaust treatment system of the vehicle, the flexible bellow having a first degree of freedom in which the first and second ends of the flexible bellow are translatable axially along the longitudinal axis, a second degree of freedom in which the first and second ends of the flexible bellow are translatable side-to-side along a second axis perpendicular to the longitudinal axis, a third degree of freedom in which the first and second ends of the flexible bellow are translatable back-and-forth along a third axis perpendicular to the longitudinal axis and perpendicular to the second axis, a fourth degree of freedom in which the first and second ends of the flexible bellow are rotatable back-and-forth about the second axis, and a fifth degree of freedom in which the first and second ends of the flexible bellow are rotatable side-to-side about the third axis, the gauge including:
- an elongate base body having a first end and a second end;
- a first holder moveably coupled to the first end of the base body, the first holder configured to receive the first end of the flexible bellow;
- a second holder coupled to the second end of the base body, the second holder configured to receive the second end of the flexible bellow;
- a first measuring scale indicating a first offset of the flexible bellow from a first reference point in the first degree of freedom;
- a second measuring scale indicating a second offset of the flexible bellow from a second reference point in the second degree of freedom;
- a third measuring scale indicating a third offset of the flexible bellow from a third reference point in the third degree of freedom;
- a fourth measuring scale indicating a fourth offset of the flexible bellow from a fourth reference point in the fourth degree of freedom; and
- a fifth measuring scale indicating a fifth offset of the flexible bellow from a fifth reference point in the fifth degree of freedom.

16. The gauge of claim 15, wherein the first measuring scale includes a plurality of reference markers located on each side of the first reference point.

17. The gauge of claim 16, wherein the first reference point and the plurality of reference markers are visibly located on the base body.

18. The gauge of claim 16, wherein the first measuring scale further includes a first pointer that travels with the first holder relative to the base body, the first pointer pointing to one of the plurality of reference markers to visually communicate an offset from the first reference point.

19. The gauge of claim 16, wherein the first holder is translatable axially along the longitudinal axis relative to the base body.

20. The gauge of claim 15, wherein the second holder is translatable side-to-side along the second axis relative to the base body, translatable back-and-forth along the third axis relative to the base body, rotatable back-and-forth about the second axis relative to the base body, and rotatable side-to-side about the third axis relative to the base body.

21. A method of facilitating proper installation of a flexible bellow using a gauge, the flexible bellow having a first end, a second end, a first degree of freedom in which the first and second ends of the flexible bellow are translatable along a first axis, and a second degree of freedom in which the first and second ends of the flexible bellow are rotatable about a second axis, the method including the steps of:
- providing a vehicle having an engine and an exhaust treatment system, the flexible bellow extending between the engine and the exhaust treatment system;
- coupling a first end of the gauge to the first end of the flexible bellow;
- coupling a second end of the gauge to the second end of the flexible bellow; and
- using a scale on the gauge to measure at least one of:
  - a distance translated by the flexible bellow in the first degree of freedom; and
  - an angle rotated by the flexible bellow in the second degree of freedom.

22. The method of claim 21, wherein the coupling steps occur after the providing step, the flexible bellow being installed in the vehicle before the coupling steps.

23. The method of claim 21, wherein the coupling steps include clamping first and second holders of the gauge onto the first and second ends of the flexible bellow.

24. The method of claim 21, wherein the scale includes a pointer and a plurality of evenly spaced reference markers.

* * * * *